Figure 1:
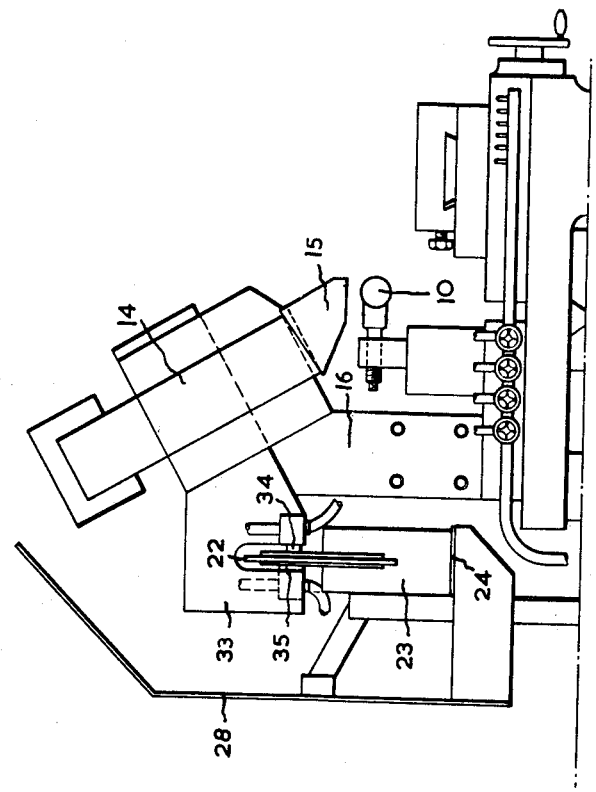

May 24, 1960

M. P. L. SIEBEL 2,938,098

TRANSMISSION OF ELECTRIC POWER AT HIGH FREQUENCY

Filed June 25, 1958

3 Sheets-Sheet 1

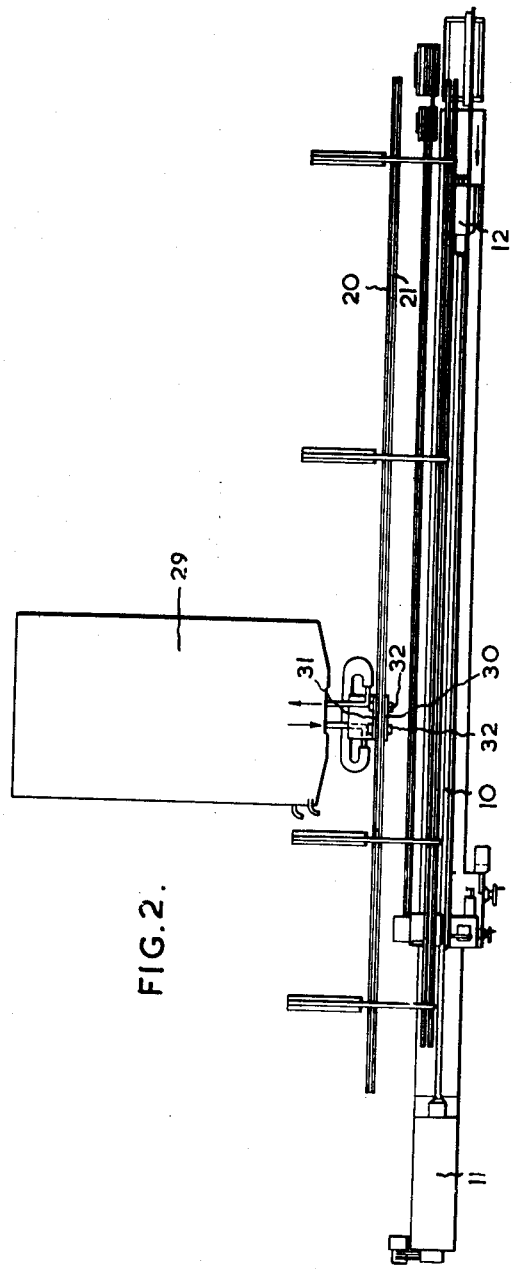

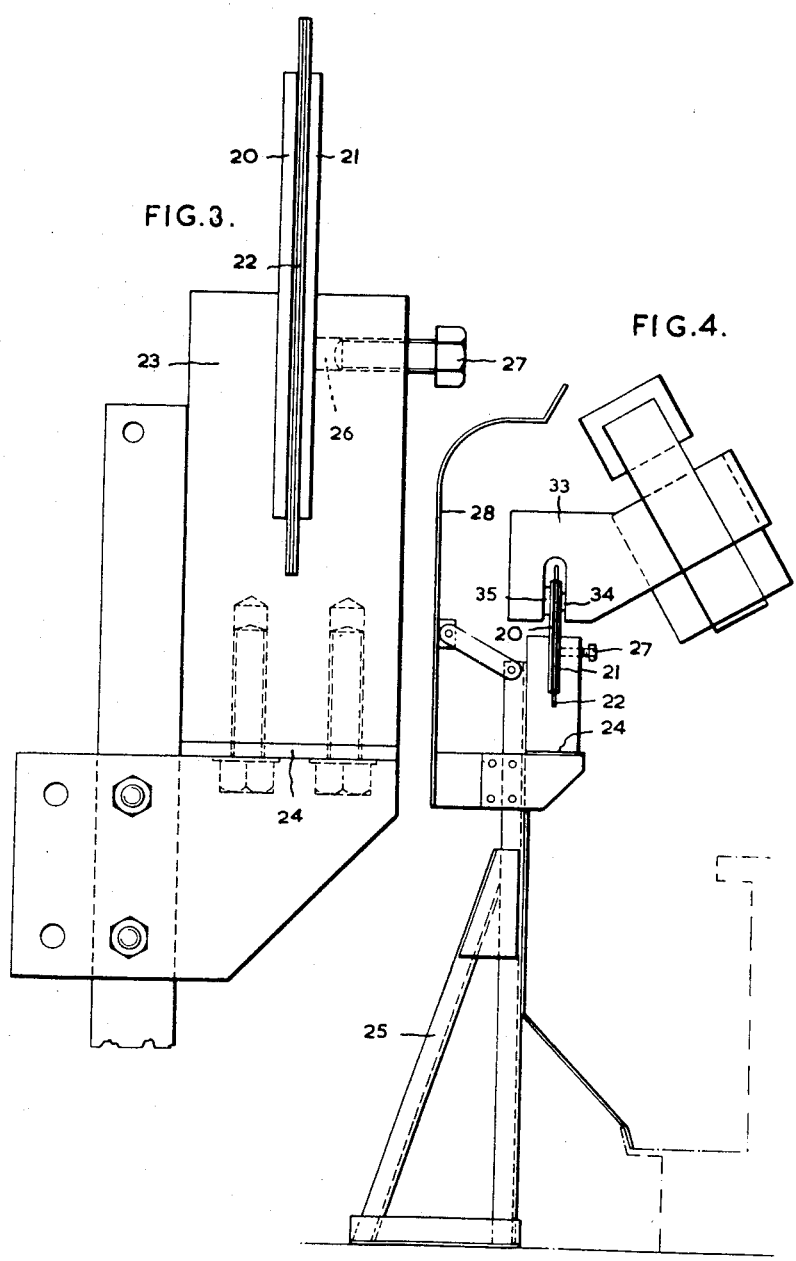

United States Patent Office 2,938,098
Patented May 24, 1960

2,938,098
TRANSMISSION OF ELECTRIC POWER AT HIGH FREQUENCY

Mathias Paul Leopold Siebel, Brooklyn, N.Y., assignor to Tube Products Limited, Birmingham, England, a British company Filed June 25, 1958, Ser. No. 744,465

Claims priority, application Great Britain June 29, 1957

3 Claims. (Cl. 219—10.75)

This invention relates to the transmission of electric power at high frequencies of the order of several hundred kilocycles per second, and relates more particularly to the transmission of current at such frequencies from a generator or other source of power to points of application of the power at varying distances from the generator, as, for example, in the application of the power at spaced points on or continuously along the length of a work-piece or article of substantial length.

One object of my invention is to enable electric power at high frequencies to be transmitted in such circumstances by means of relatively simple and inexpensive conductors without the use of co-axial cables or the like.

A further object is to reduce to a minimum electrical losses from the conductors.

According to my invention, high frequency electric current from a generator or the like is supplied to copper conductors extending substantially parallel to an elongated work-piece, and a movable head or the like by which power is applied to the work-piece receives current through sliding contacts held resiliently in engagement with the conductors.

The conductors comprise flat copper strips on opposite sides of and separated by a layer of insulating material, preferably material having a low power factor so that it can be of minimum thickness. The insulating material extends a substantial distance beyond the edges of the copper strips to avoid risk of flash-over.

With this arrangement the cross-sectional area of the loop formed by the conductors is reduced to a minimum so that there is a minimum radiation of energy, which is very important when using heavy currents of frequencies of the order of 300 kilocycles.

One practical layout embodying my invention is illustrated by way of example in the accompanying drawings in which:

Figure 1 is an end elevation of a machine for performing a welding or like operation along the length of a tube or bar, the current being supplied to a welding head from conductors in accordance with the invention, Figure 2 is a plan of the machine on a smaller scale, Figure 3 is an end view on a larger scale, of one of the mounts for the conductors, Figure 4 is an end view of one of the floor supports carrying the conductors.

Figures 1 and 2 show a machine designed for performing a welding or like operation along the length of a tube 10 which is mounted between the headstock 11 and the tail stock 12 of a lathe.

The welding operation is performed with current from a transformer 14 which, with a welding head 15 or other ancillary equipment (not shown), is moved longitudinally parallel to the axis of the tube by any convenient known means.

The transformer may, for example, be mounted on a support 16 which is guided for sliding movement on the bed of the lathe and is moved longitudinally by the lead screw of the lathe or by a separate drive provided for the purpose.

Current is supplied to the transformer from current conductors or bus-bars which extend longitudinally parallel to the axis of the tube and are of a length substantially equal to that of the tube.

The current conductors or bus-bars comprise two flat copper strips 20, 21 of substantial width mounted on opposite sides of and separated by a flat layer of insulating material 22 which is of a width such that it extends a sufficient distance beyond the edges of the strips to avoid risk of flash-over. In the particular example illustrated where the current carried is between 500 and 700 amps. at 300 volts and a frequency of 300 kilocycles the bus-bars are ¼ inch thick and 8 inches wide and the insulating material is 10 inches wide and is built up from three laminations each ⅛ inch thick. Polythene has been found to be a suitable insulating material. The length of the bus-bars is at least equal to the travel of the transformer to be fed with current. If joints are necessary in the laminations of the insulating material, the joints should be overlapped for a considerable length.

The bus-bars are mounted in spaced blocks 23 of insulating material bolted to brackets 24 on frames 25 as shown more particularly in Figures 3 and 4 of the drawings. A slot is cut in the upper end of each block of a width such that the bus-bars and the insulation between them are a good fit in the slot in which they are clamped by a plug 26 of insulating material backed by a set screw 27. The frames 25 also carry guards 28 extending for the full length of the bus-bars.

Current is taken to the bus-bars or strips 20, 21 at the middle of their length from an oscillator 29. The leads from the oscillator-generator are connected to plates 30, 31 which are separated by a layer of insulating material and the ends of which are extended and cranked upwardly to lie against the strips 20, 21 to which they are secured by screws 32. The plates 30, 31 may be water-cooled.

For taking current from the bus-bars to the transformer the transformer carries a stirrup or caliper 33 of insulating material which straddles the bus-bars and in which are mounted opposed spring-pressed contact brushes or plungers 34, 35 held in sliding engagement with the respective strips 20 and 21.

I claim:

1. Means for conveying electric power at high frequency from a power source to a power-consuming unit movable along a predetermined path, comprising a current conducting assembly formed by flat copper strips of substantial width in relation to their thickness and a flat layer of insulating material of greater width than the strips located between said strips, the assembly formed by the copper strips and the interposed insulating material extending substantially parallel to said path and being of a length substantially equal to said path, and the assembly being clamped in slots in block of insulating material mounted on spaced supports, connections from the power source to the strips about the middle of their length, and sliding contacts held resiliently in contact with the strips and carried by the power-consuming unit.

2. Means as in claim 1 wherein said power-consuming unit carries a caliper which straddles the assembly formed by the copper strips and the interposed insulating material, and said sliding contacts comprise brushes movably mounted in said caliper and resiliently urged into engagement with the copper strips.

3. Means for conveying electric power at high frequency from a power source to a head for performing work on an elongated work-piece, comprising a current conducting assembly formed by two flat copper strips of substantial width and a layer of insulating material of greater width than the strips located between them, said assembly extending parallel to the work-piece, an oscillator-generator adjacent to the middle of the length of said assembly, connections between the oscillator-generator and the adajacent portions of the copper strips, a transformer associated with said head and guided for movement parallel to said assembly, and contacts carried by said transformer and held in sliding engagement with the copper strips.

References Cited in the file of this patent

UNITED STATES PATENTS

| | | |
|---|---|---|
| 1,304,703 | Palmer | May 27, 1919 |
| 2,246,806 | Martin | June 24, 1941 |
| 2,474,420 | Himmel | June 28, 1949 |
| 2,617,849 | Wright et al. | Nov. 11, 1952 |
| 2,848,631 | Tibbs | Aug. 19, 1958 |
| 2,871,331 | Ustica | Jan. 27, 1959 |

FOREIGN PATENTS

| | | |
|---|---|---|
| 10,363 of 1900 | Great Britain | Apr. 6, 1901 |